April 21, 1925.  1,534,679

F. J. BOSTOCK ET AL

CONCENTRIC GEAR UNIT

Filed March 29, 1923

Inventors:
Francis J. Bostock, &
Swinfen Bramley-Moore
by Herbert W. T. Jenner
Attorney.

Patented Apr. 21, 1925.

1,534,679

UNITED STATES PATENT OFFICE.

FRANCIS JOHN BOSTOCK AND SWINFEN BRAMLEY-MOORE, OF HUDDERSFIELD, ENGLAND.

CONCENTRIC GEAR UNIT.

Application filed March 29, 1923. Serial No. 628,424.

*To all whom it may concern:*

Be it known that we, FRANCIS JOHN BOSTOCK and SWINFEN BRAMLEY-MOORE, subjects of King George V of Great Britain, residing at Netherton, Huddersfield, in the county of York, England, have invented a new and useful Improvement in Concentric Gear Units, of which the following is a specification.

The invention relates to the concentric type of gear units, in which the axes of both the driving and driven shafts are arranged in the same straight line, and connected together in any suitable manner through the medium of one or more subsidiary shafts, by any suitable known form of toothed or friction gearing.

In the improved gear unit provided by our invention a framework carrying the driving and driven shafts is supported by one or more fixed bearings concentric with the driving and driven shafts and is, apart from the mechanism shortly to be referred to, free to rock, oscillate, or rotate in said bearing or bearings. If the framework were allowed to rotate freely, no motion would be transmitted to the driven shaft. In our invention we restrain the framework from free rotary movement by means of a flexible controlling device which allows the framework only a limited motion, such control being effected by means of springs, or by a suitable dashpot or other equivalent device.

Figure 1:
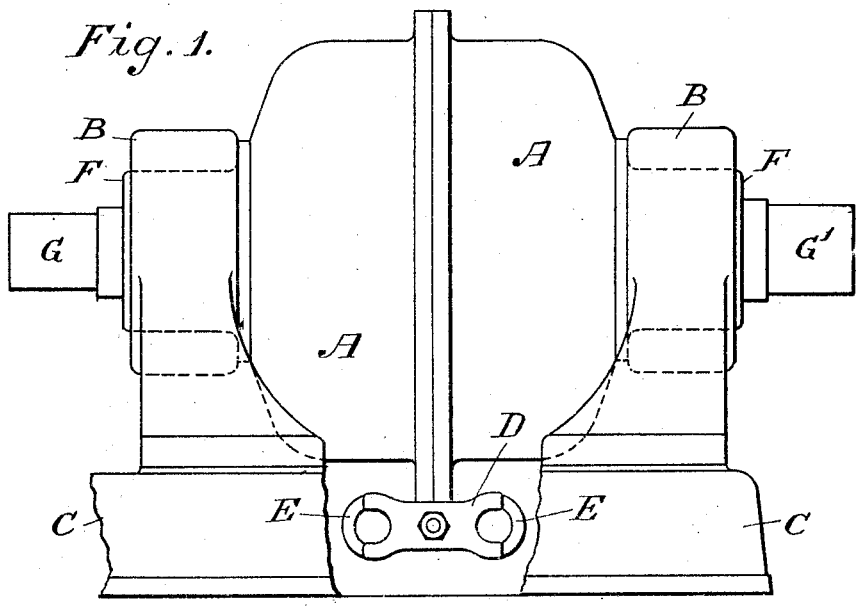
Figure 2:
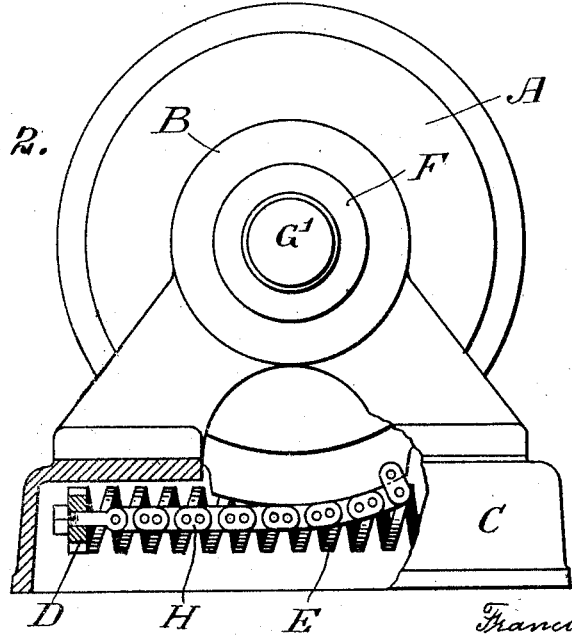

One good practical method of carrying out the invention is illustrated in the accompanying drawing, Fig. 1 being a side view and Fig. 2 a front view of a gear unit embodying one form of the invention, a portion of the bed being broken away in each figure.

In the drawing the driving and driven shafts are indicated respectively by G and G'. They are mounted in the same axial alignment, are connected together in known manner by means of suitable toothed or friction gearing, and are carried by a framework A which is furnished with suitable trunnions F and mounted in fixed bearings B, B. The bearings B are secured to a bed plate C. The latter also carries the flexible controlling device which, in the illustrated embodiment, consists of shock absorbing springs E. Connection is made between the framework A and the springs E through the medium of a plate D linked up to the framework A by means of a chain H or any other convenient arrangement.

When power is being transmitted from the driving to the driven shaft there is set up in the framework A a reaction which tends to cause it to rotate, and this rotation is resisted by the compression of the springs E acting through the chain H. The load on the springs corresponds to the force tending to cause rotation of the framework, and any variation in load or speed of the driving or driven shafts causes a corresponding variation in the pull of the chain H and compression of the springs E, thus providing a flexible controlling device to the framework A, against rotation.

It will be obvious that instead of the framework A being furnished with two trunnions, the framework itself may be suitably turned on its outer or other diameter and in like manner be free to oscillate on this portion in a single fixed bearing against a flexible controlling device.

It will be apparent that, if the driving shaft revolves at a uniform rate, and the framework be held stationary, a uniform motion will be transmitted to the driven shaft. If, however, the framework be allowed rotary movement, then a corresponding increase or decrease will take place in the speed of the driven shaft, such increase or decrease being dependent upon the gear ratio between the driving and driven shafts. Conversely, if either the driving or driven shaft rotate at other than a uniform speed, then, if the framework move or oscillate with a suitable relative motion, it follows that the speed of the driven shaft can be made constant. Thus irregularities in the speed of a prime mover can be absorbed or compensated for by the oscillations of the framework. For example, a uniform motion can thus be obtained from Diesel engines, and other prime movers running at fluctuating or irregular speeds. Moreover, should the load or torque passing through the system pulsate or fluctuate, the framework is able to oscillate accordingly. The sudden application of a heavier load would cause a further deflection of the flexible controlling device resisting the rotation of the framework and thus relieve the mechanism connecting the driving and driven shafts from the sudden shock which would otherwise be tran mitted. The removal of the extra load or torque would enable the flexible controlling device to bring the framework back into its normal working position.

The above described arrangement of flexibly mounting the framework carrying the driving and driven shafts of a concentric type gear unit enables the mechanism of such a unit to withstand sudden shocks and pulsating loads, and also compensates for irregularities in speed.

The particular embodiment or mode of practically applying the invention which we have chosen to illustrate and describe is only given by way of example, and it will be obvious to those skilled in the art that there are many equivalent ways in which the framework may be supported in one or more fixed bearings and be free to oscillate against a flexible controlling device in the manner and for the purposes set forth. We do not therefore, wish to limit ourselves to such embodiment.

Having thus described our invention, what we claim as new and desire to secure by Letters Patent is:—

1. In a concentric gear unit, the combination, with a rotatably supported framework provided with trunnions working in fixed bearings, of means to yieldingly resist rotation of said framework.

2. In a concentric gear unit, the combination, with a rotatably supported framework provided with trunnions working in fixed bearings, of springs mounted for compression, and connections between the framework and said springs whereby the latter act to yieldingly resist rotation of the framework.

3. A concentric type of gear unit, comprising driving and driven shafts arranged in the same axial alignment, gearing connecting the said shafts, a framework provided with trunnions working in fixed bearings and supporting said shafts and said gearing, and a flexible device for controlling rotary movement of said framework.

4. A concentric type of gear unit, comprising driving and driven shafts arranged in the same axial alignment, gearing connecting the said shafts, a framework provided with trunnions working in fixed bearings and supporting said shafts and said gearing, and springs acting to yieldingly resist rotation of the framework.

5. A concentric type of gear unit, comprising driving and driven shafts arranged in the same axial alignment, gearing connecting the said shafts, a framework supporting said shafts and said gearing, trunnions on said framework, fixed bearings in which said trunnions are mounted, a bed plate carrying said bearings, springs attached to said bed plate, and connections between said springs and the framework whereby the springs operate to yieldingly resist rotation of the framework.

In testimony whereof we affix our signatures.

FRANCIS JOHN BOSTOCK.
SWINFEN BRAMLEY-MOORE.